United States Patent
Cho et al.

(10) Patent No.: US 8,599,922 B2
(45) Date of Patent: Dec. 3, 2013

(54) APPARATUS AND METHOD OF ESTIMATING MOTION USING BLOCK DIVISION AND COUPLING

(75) Inventors: Yang Ho Cho, Hwaseong-si (KR); Ho Young Lee, Suwon-si (KR); Du-Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 292 days.

(21) Appl. No.: 12/591,798

(22) Filed: Dec. 1, 2009

(65) Prior Publication Data

US 2010/0149423 A1    Jun. 17, 2010

(30) Foreign Application Priority Data

Dec. 2, 2008  (KR) .................. 10-2008-0120868

(51) Int. Cl.
| | |
|---|---|
| *H04N 7/12* | (2006.01) |
| *H04N 11/02* | (2006.01) |
| *H04N 11/04* | (2006.01) |

(52) U.S. Cl.
USPC ............. 375/240.16; 375/240.02; 375/240.24

(58) Field of Classification Search
None
See application file for complete search history.

(56) References Cited

U.S. PATENT DOCUMENTS

| | | | | |
|---|---|---|---|---|
| 5,508,744 | A * | 4/1996 | Savatier ................... | 375/240.16 |
| 6,081,209 | A * | 6/2000 | Schuyler et al. ................ | 341/51 |
| 6,240,214 | B1 * | 5/2001 | Cho .............................. | 382/247 |
| 2004/0081238 | A1 * | 4/2004 | Parhy ........................ | 375/240.16 |
| 2005/0141614 | A1 * | 6/2005 | Braspenning et al. ... | 375/240.16 |
| 2005/0232499 | A1 * | 10/2005 | Ha et al. ........................ | 382/236 |
| 2006/0193388 | A1 * | 8/2006 | Woods et al. ............. | 375/240.16 |
| 2007/0071100 | A1 * | 3/2007 | Shi et al. ................... | 375/240.16 |
| 2010/0201830 | A1 * | 8/2010 | Hosoda ...................... | 348/220.1 |

FOREIGN PATENT DOCUMENTS

| | | |
|---|---|---|
| KR | 10-2005-0009844 | 1/2005 |
| KR | 10-2005-0014569 | 2/2005 |
| KR | 10-2005-0022206 | 3/2005 |
| KR | 10-2005-0033098 | 4/2005 |
| KR | 10-2005-0045746 | 5/2005 |
| KR | 10-2005-0055553 | 6/2005 |
| KR | 10-2005-0095931 | 10/2005 |
| KR | 10-2005-0100321 | 10/2005 |

OTHER PUBLICATIONS

"Fast Variable-Size Block Motion Estimation Using Merging Procedure with an Adaptive Threshold", Tu Yu-Kuang, Jar-Ferr Yang, Yi-Nung Shen, Ming-Ting Sun. Department of Electrical Engineering, National Cheng Kung University, Taiwan, Department of Electrical Engineering, University of Washington, IEEE Copyright 2003.*

* cited by examiner

*Primary Examiner* — Joseph Ustaris
*Assistant Examiner* — Kevin McInnish
(74) *Attorney, Agent, or Firm* — Staas & Halsey LLP (57) ABSTRACT

Provided are an apparatus and method of estimating a motion using block coupling and block division. In the apparatus, a block having a motion estimation error greater than a predetermined value may be coupled with a neighbor block, and motion estimation is performed through the coupled block to improve a frame rate, thereby reducing an artifact phenomenon in an interpolated image.

18 Claims, 10 Drawing Sheets

APPARATUS AND METHOD OF ESTIMATING MOTION USING BLOCK DIVISION AND COUPLING

CROSS-REFERENCE TO RELATED APPLICATIONS

This application claims the priority benefit of Korean Patent Application No. 10-2008-0120868 filed on Dec. 2, 2008, in the Korean Intellectual Property Office, the disclosure of which is incorporated herein by reference.

BACKGROUND

1. Field

Exemplary embodiments relate to a technique that may improve a frame rate based on motion estimation using division or coupling of a hierarchical block.

2. Description of the Related Art

In general, a motion estimation technique between image blocks in a video sequence may be imperatively performed for image processing, such as a Frame Rate up Conversion (FRC), an Interlaced to Progressive Conversion (IPC), etc. in digital signal processing. This motion estimation technique may compare, using a block matching algorithm, a previous frame and a current frame, that is, two consecutively inputted frames, by a block unit, to thereby estimate a single moving vector per block. In this instance, the moving vector may be estimated using a motion predictive error value, and motion compensation may be performed using the estimated moving vector estimated in a motion compensation process.

In a conventional motion estimation method, motion estimation is applied by a fixed type-block unit, and thus the moving vector may not be accurately estimated due to a boundary or a closed area where a motion different from a previous motion is generated in a corresponding block, whereby the motion estimation error may be increased.

SUMMARY

Additional aspects and/or advantages will be set forth in part in the description which follows and, in part, will be apparent from the description, or may be learned by practice of the invention.

The foregoing and/or other aspects are achieved by providing an apparatus to estimate a motion, the apparatus including: a block coupling unit coupling blocks in which a motion estimation error with respect to an input image is greater than a predetermined value; and a motion estimation unit estimating a motion of the coupled blocks.

The foregoing and/or other aspects are achieved by providing a method of estimating a motion, the method including: coupling blocks in which a motion estimation error with respect to an input image is greater than a predetermined value at a block coupling unit; and estimating a motion of the coupled blocks at a motion estimation unit.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Reference will now be made in detail to exemplary embodiments, examples of which are illustrated in the accompanying drawings, wherein like reference numerals refer to the like elements throughout. Exemplary embodiments are described below to explain the present invention by referring to the figures.

Hereinafter, exemplary embodiments will be described in detail with reference to the accompanying drawings. When it is determined the detailed description related to a known function or configuration may render the purpose of the present invention unnecessarily ambiguous in describing the present invention, the detailed description will be omitted here.

Figure 1:
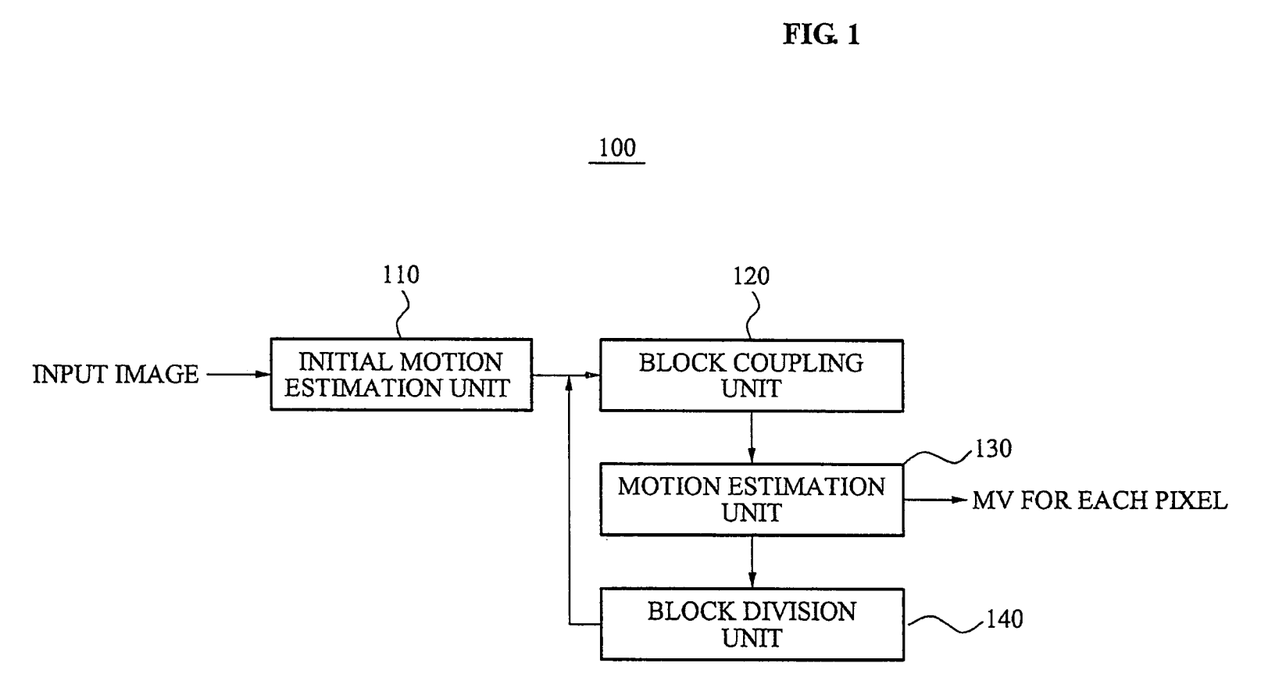
FIG. 1 is a diagram illustrating a configuration of an apparatus of estimating a motion according to exemplary embodiments.

FIG. 1 is a diagram illustrating a configuration of an apparatus 100 of estimating a motion according to exemplary embodiments.

Referring to FIG. 1, the apparatus 100 according to the embodiments may include an initial motion estimation unit 110, a block coupling unit 120, a motion estimation unit 130, and a block division unit 140.

The initial motion estimation unit 110 may estimate an initial moving vector for each block with respect to an input image. The initial moving vector may be estimated by various motion estimation schemes, and a number of blocks that may update the moving vector to be a variable block type according to the accuracy of a used motion estimation scheme may vary.

As for the apparatus 100 according to the embodiments, with an increase in the accuracy of the estimated initial moving vector, an amount of operations for an updating process of the moving vector may be reduced and an accuracy of the updating process may be increased.

However, an increase of the motion estimation error by the initial motion estimation unit 110 may occur in a case in which the moving vector may not be accurately estimated due to a boundary or a closed area where a motion different from a previous motion is generated in a corresponding block. In the corresponding block, a motion compensation process of compensating for a motion by a block unit having the same size as that of a block used in the initial motion estimation may disadvantageously adapt only a partial optimization process. That is, in a block having no corresponding points between frames such as the closed area, a dispersion of the moving vector estimated between blocks may significantly increase. In this case, a deterioration of an image quality, such as a blocking artifact in which a boundary is irregularly regenerated in an interpolated frame, may occur.

Therefore, the apparatus 100 according to the embodiments may couple blocks in which the motion estimation error is great using the block coupling unit 120, and estimate an optimized moving vector with respect to the coupled blocks using the motion estimation unit 130.

The block coupling unit 120 may perform a block coupling process when the motion estimation error generated in the initial motion estimation unit 110 is greater than a predetermined value. That is, the block coupling unit 120 may determine whether a block, from among neighbor blocks with respect to blocks in which the motion estimation error is greater than the predetermined value, in which the motion estimation error is greater than the predetermined value exists, and may couple the blocks in which the motion estimation error is greater than the predetermined value.

As described above, the apparatus 100 according to the embodiments may couple blocks having generated problems, and perform the motion estimation by a block unit having a size greater than that of an initially set block, whereby a correlation of the moving vector between blocks may increase.

Also, in the apparatus 100 according to the embodiments, since the moving vector estimated in the coupled blocks may be equally assigned to each block, a variance of the moving vector between blocks may be reduced, whereby deterioration in an image quality of an interpolated image may not be perceptible.

Figure 2:
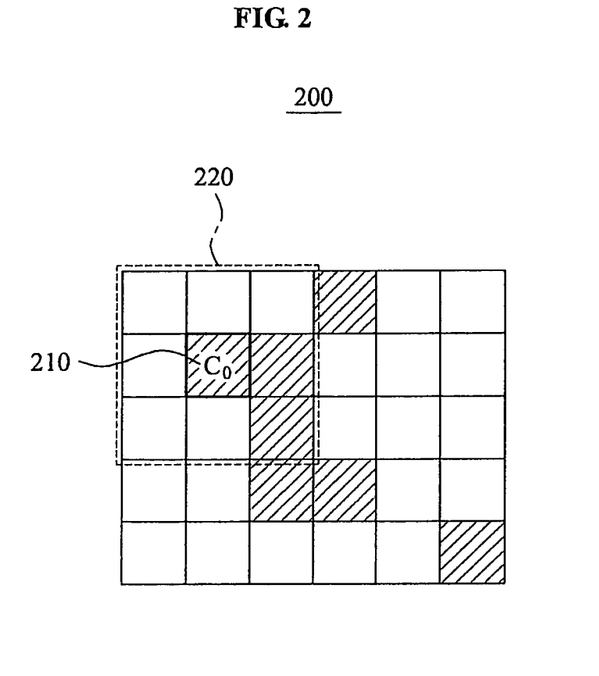
FIG. 2 is a diagram illustrating an example of a block in which a motion estimation error is increased.

FIG. 2 is a diagram illustrating an example of a block in which a motion estimation error is increased.

Referring to FIG. 2, in an input image 200, blocks in which the motion estimation error is greater than the predetermined value may be illustrated using bias, and $C_0$ may designate a current process block 210 in which the motion estimation is currently processed. A neighbor area 220 including neighbor blocks adjacent to the current process block ($C_0$, 210) may be illustrated using a dotted line. If blocks having the motion estimation error greater than the predetermined value exists from among the neighbor blocks existing within the neighbor area 220, these blocks may be coupled as illustrated in FIG. 3.

As described above, the block coupling unit 120 may determine whether a block having the motion estimation error greater than the predetermined value exists from among the neighbor blocks with respect to the current process block 210, that is, the blocks having the motion estimation error greater than the predetermined value, and couple the blocks having the motion estimation error greater than the predetermined value.

Figure 3:
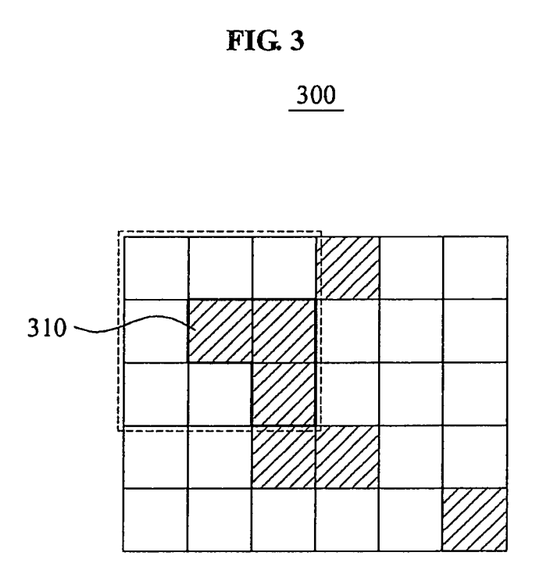
FIG. 3 is a diagram illustrating an example of block re-coupling result of a block considering a neighbor block.

FIG. 3 is a diagram illustrating an example of a block re-coupling result of a block considering a neighbor block.

Referring to FIG. 3, in a block re-coupling result 300 considering the neighbor block, a coupled block 310 may be illustrated using a bold solid line. The coupled block 310 may be obtained by coupling the current process block 210, from among the neighbor blocks included in the neighbor area 220, with the neighbor blocks having the motion estimation error greater than the predetermined value, as illustrated in FIG. 2.

Figure 4:
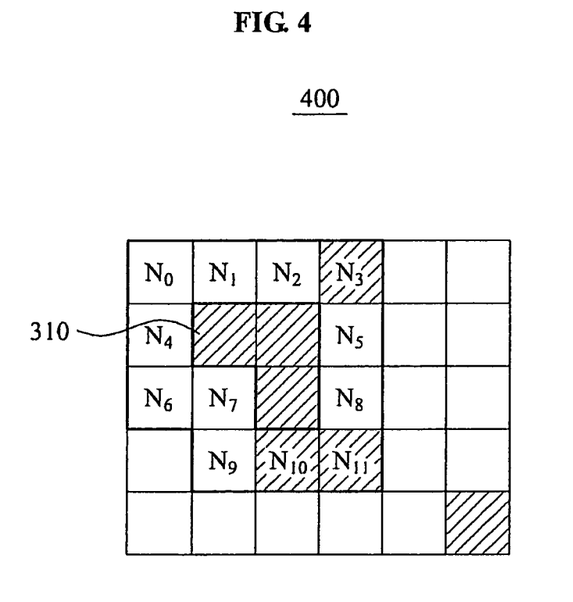
FIG. 4 is a diagram illustrating an example in which a moving vector of a neighbor block is used in a re-coupled block with respect to $C_0$.

FIG. 4 is a diagram illustrating an example in which a moving vector of a neighbor block is used in a re-coupled block with respect to $C_0$.

Referring to FIG. 4, the motion estimation unit 130 may estimate, in image data 400 including neighbor blocks $N_0$ to $N_{11}$ adjacent to the coupled block 310, a motion of the coupled block 310 using a moving vector of the neighbor blocks $N_0$ to $N_{11}$ as a candidate vector. Here, $N_i$ (i=0 to 11) may designate the neighbor block, and a moving vector of a block having the motion estimation error greater than the predetermined value, such as $N_3$, $N_{10}$, and $N_{11}$ from among the neighbor blocks, may not be used as the candidate vector. The motion estimation unit 130 may perform the motion estimation on a search area within a predetermined range in x-axis and y-axis directions with respect to the moving vector of the neighbor block. For example, the motion estimation unit 130 may perform the motion estimation on the search area within the predetermined range with respect to a moving vector of remaining neighbor blocks $N_0$ to $N_2$, and $N_4$ to $N_9$, excluding the blocks $N_3$, $N_{10}$, and $N_{11}$ having the motion estimation error greater than the predetermined value from among the neighbor blocks. Since a moving vector of a finally coupled block may be selected from among the moving vectors of the neighbor blocks, an irregular moving vector may be prevented from being estimated, thereby increasing a correlation of a moving vector between blocks.

Figure 5:
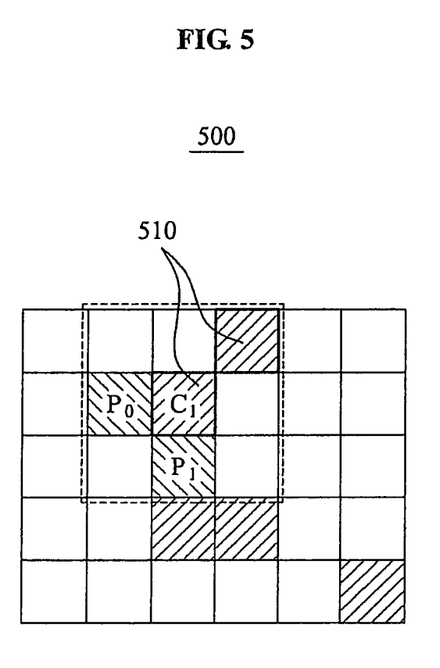
FIG. 5 is a diagram illustrating an example of a block processed after a motion estimation of a re-coupled block is performed, and an example of a block re-coupling result.

FIG. 5 is a diagram illustrating an example of a block processed after a motion estimation of a re-coupled block is performed, and an example of a block re-coupling result 500.

Referring to FIG. 5, when performing the motion estimation after the block coupling is performed with respect to the $C_0$ block 210 of FIG. 2, $P_0$ and $P_1$ blocks expressed as bias may be blocks in which the motion estimation errors are equal to or less than the predetermined value after updating the moving vector.

Conversely, in a case of $C_1$ block of FIG. 5, that is, a block to the right of the $C_0$ block of FIG. 2, the motion estimation error may not be reduced to be less than the predetermined value even through the motion estimation of the coupled block with respect to the $C_0$ block of FIG. 2(510).

Figure 6:
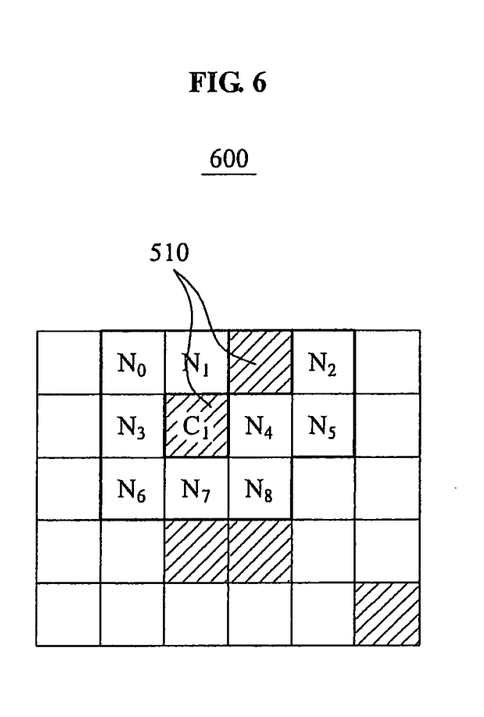
FIG. 6 is a diagram illustrating an example in which a moving vector of a neighbor block is used in a re-coupled block with respect to $C_1$.

Accordingly, in this case, the neighbor blocks with respect to the $C_0$ block of FIG. 2 may be coupled again, and then, the motion estimation unit 130 may perform the motion estimation based on the moving vector of the neighbor block, as illustrated in FIG. 6.

FIG. 6 is a diagram illustrating an example 600 in which a moving vector of a neighbor block is used in a re-coupled block with respect to $C_1$ of FIG. 6.

Referring to FIG. 6, the block coupling unit 120 may couple eight neighbor blocks with respect to the $C_1$ block of FIG. 6, and the motion estimation unit 130 may perform the motion estimation of the coupled block using the moving vector of the neighbor block as a candidate vector.

Figure 7:
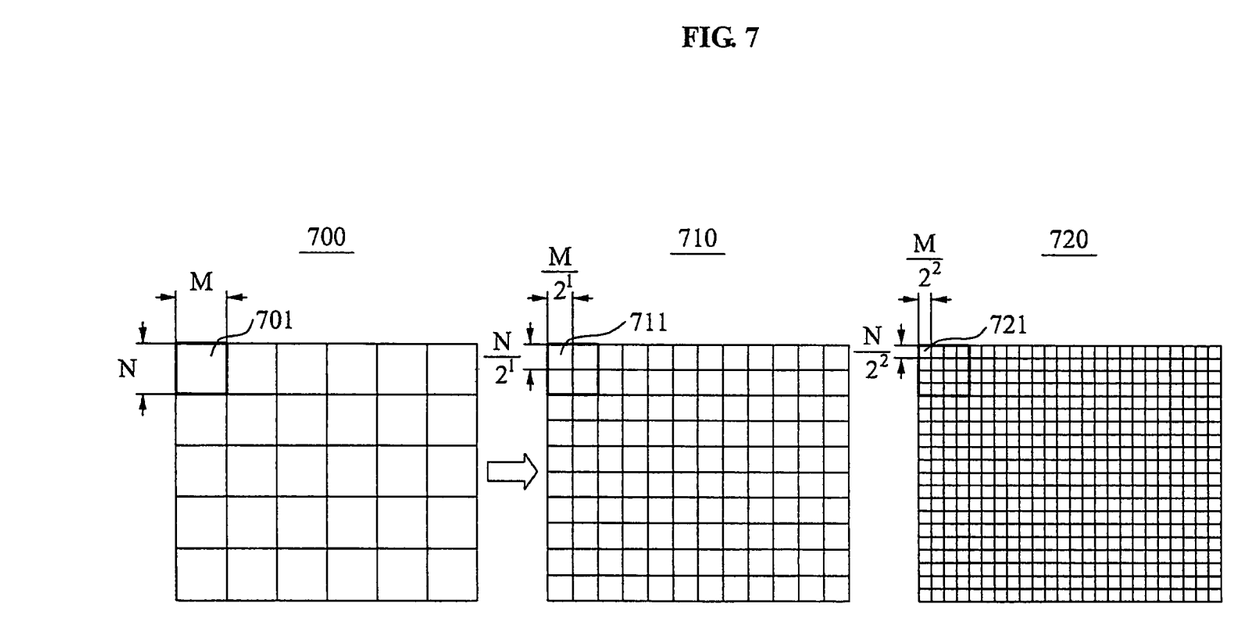
FIG. 7 is a diagram illustrating an example of a block division process.

FIG. 7 is a diagram illustrating an example of a block division process.

Referring to FIG. 7, the block division unit 140 may vertically and horizontally divide a size of the block having the motion being estimated. A basic image data 700 may be configured of basic blocks 701 having a size of N×M, a first image data 710 may be configured of divided blocks 711 having a size of N/2×M/2, and a second image data 720 may be configured of divided blocks 721 having a size of N/4×M/4. For example, the block division unit 140 may divide the basic block 701, having the size of N×M, into four equal parts to obtain the division blocks 711 having a size of N/2×M/2, and further divide the obtained division blocks 711 into four equal parts to obtain the division blocks 721 having a size of N/4×M/4. As described above, the block division unit 140 may determine a minimum division unit considering a complexity of an algorithm, and may use a moving vector of a pixel unit, as illustrated in FIG. 1, to divide a block.

Figure 8:
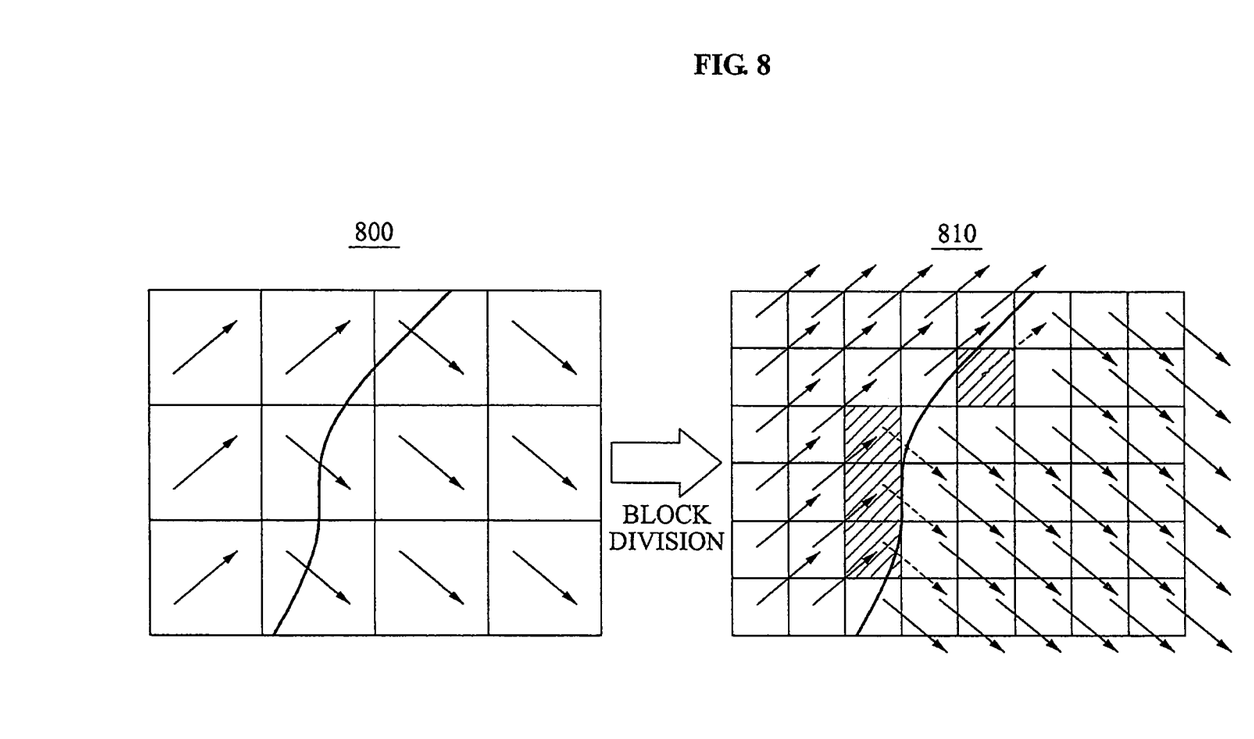
FIG. 8 is a diagram illustrating an example of an assignment of a moving vector in a divided block, and an example of a block in which a motion estimation error is increased in the divided block.

FIG. 8 is a diagram illustrating an example of an assignment of a moving vector in a divided block, and an example of a block in which a motion estimation error is increased in the divided block.

Referring to FIG. 8, the block division unit 140 may assign, to each divided block of divided image blocks 810, the moving vector estimated with respect to each block of previous image blocks 800 before a block is divided.

Figure 9:
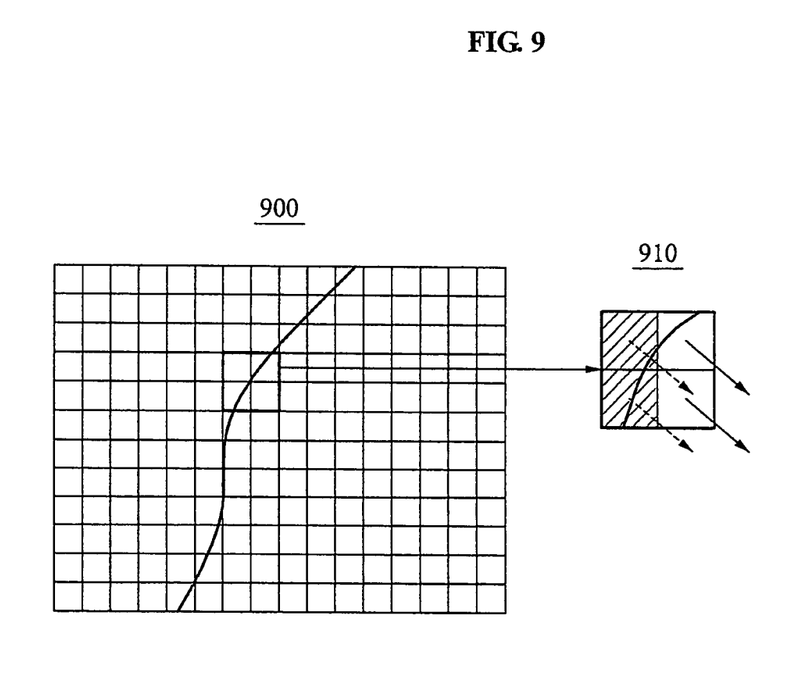
FIG. 9 is a diagram illustrating an example of an assignment of a moving vector in a re-divided block, and an example of a block in which a motion estimation error is increased in the re-divided block.

FIG. 9 is a diagram illustrating an example of an assignment of a moving vector in a re-divided block, and an example of a block in which a motion estimation error is increased in the re-divided block.

Referring to FIG. 9, partial image data 910 including blocks in which a motion estimation error with respect to a boundary is greater than a predetermined value from among image blocks 900 may be shown. That is, the partial image data 910 may have the blocks in which the motion estimation error generated in the boundary included in the image blocks 900 is greater than the predetermined value.

When a motion estimation error of a neighbor block, adjacent to the block having the motion estimation error greater than the predetermined value, is greater than the predetermined value in the partial image data 910, the block coupling unit 120 may re-couple the neighbor blocks.

The motion estimation unit 130 may exclude the neighbor block having the motion estimation error greater than the predetermined value from among the neighbor blocks adjacent to the re-coupled blocks, and may perform a motion estimation with respect to the re-coupled block using a moving vector of a neighbor block having the motion estimation error less than the predetermined value, thereby estimating a moving vector for each pixel.

Figure 10:
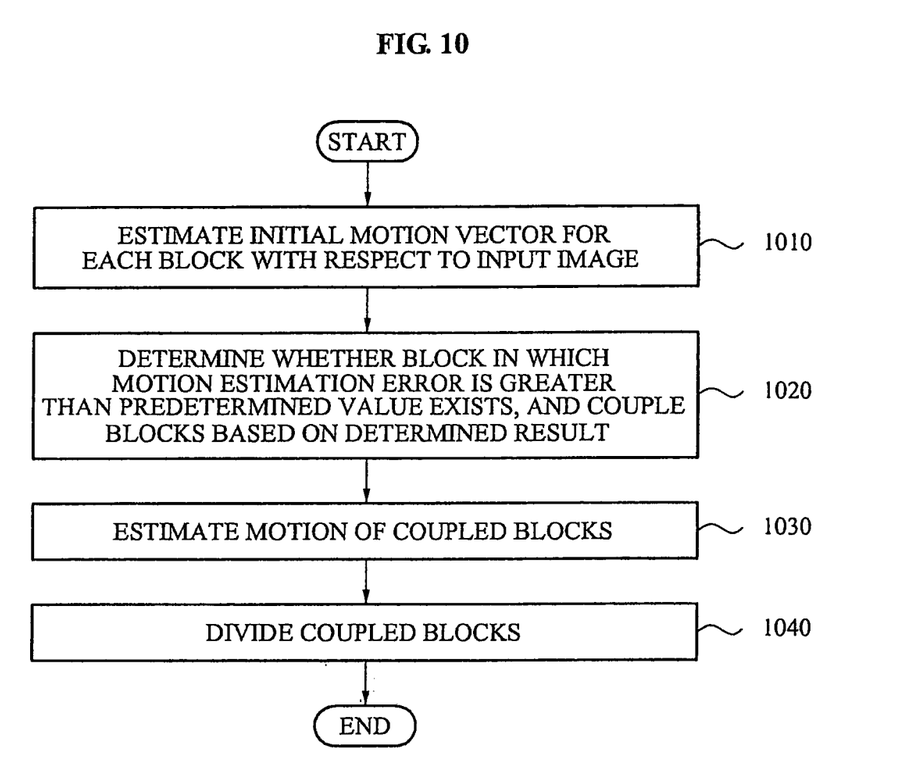
FIG. 10 is a flowchart illustrating a method of estimating a motion according to exemplary embodiments.

FIG. 10 is a flowchart illustrating a method of estimating a motion according to exemplary embodiments.

Referring to FIGS. 1 to 10, in operation 1010, the apparatus 100 may estimate an initial moving vector for each block with respect to an input image. That is, in operation 1010, the apparatus 100 may estimate the initial moving vector for each block with respect to the input image using a general motion estimation method through the initial motion estimation unit 110.

In the method according to the embodiments, with an increase in accuracy of the estimated initial moving vector, an operation amount of an updating process of a moving vector may be reduced and an accuracy of the updating process may be increased.

However, in operation 1010, the moving vector may not be accurately estimated due to a boundary or a closed area in which a motion different from the previous one is generated in a corresponding block, when a motion estimation is performed using the initial motion estimation unit 110. Accordingly, an error may occur when estimating the moving vector in the above described block.

Therefore, in operation 1020, the method according to the embodiments may couple blocks having a relatively great motion estimation error, and in operation 1030, the method may estimate an optimized moving vector using remaining blocks other than blocks having the motion estimation error greater than the predetermined value from among neighbor blocks with respect to the coupled block.

Also in operation 1020, the apparatus 100 may determine whether the blocks having the motion estimation error greater than the predetermined value exists, and couple the blocks based on the determined result. That is, in operation 1020, the apparatus 100 may determine, using the block coupling unit 120, whether the block, in which the motion estimation error with respect to the estimated initial moving vector is greater than the predetermined value, exists, and couple the blocks having the motion estimation error greater than the predetermined value. For example, in operation 1020, when determining that a block having a motion estimation error, with respect to the current process block 210, greater than the predetermined value exists, the apparatus 100 may couple the current process block 210 and neighbor blocks having the motion estimation error greater than the predetermined value in the neighbor area 220 including the neighbor blocks adjacent to the current process block 210, thereby generating the coupled block 310 as illustrated in FIG. 3.

As described above, the method according to the embodiments may perform the motion estimation by a block unit having a size greater than that of an initially set block by coupling the blocks in which the motion estimation error with respect to the initial moving vector is greater than the predetermined value, thereby increasing a correlation of the moving vector between the blocks.

In operation 1030, the apparatus 100 may estimate a motion of the coupled blocks. That is, in operation 1030, the apparatus 100 may estimate the motion of the coupled blocks using the moving vector of the neighbor block adjacent to the coupled block through the motion estimation unit 130.

For example, in operation 1030, the apparatus 100 may select, from among the neighbor blocks adjacent to the coupled blocks, a neighbor block based on a compared result of the motion estimation error and the predetermined value using the motion estimation unit 130, and estimate the motion of the coupled blocks using the selected neighbor block. That is, in operation 1030, the apparatus 100 may select, from among the neighbor blocks adjacent to the coupled blocks, remaining neighbor blocks other than neighbor blocks in which the motion estimation error is greater than the predetermined value using the motion estimation unit 130, and estimate the motion of the coupled blocks using a moving vector of the selected neighbor block as a candidate vector.

In operation 1030, the apparatus 100 may estimate, using the motion estimation unit 130, a motion of the coupled blocks for a search area within a predetermined range with respect to a moving vector of a neighbor block having the motion estimation error that is less than the predetermined value from among the neighbor blocks adjacent to the coupled blocks.

In operation 1040, the apparatus 100 may vertically and horizontally divide the block having the motion being estimated. That is, in operation 1040, the apparatus 100 may evenly divide a size of the block having the motion being estimated in x-axis and y-axis directions using the block division unit 140.

For example, in operation 1040, the apparatus 100 may designate a block division frequency considering a complexity of a hardware and a resolution of an image, and may perform motion estimation by a pixel unit to divide the block.

In operation 1040, the apparatus 100 may assign, to the divided block, the estimated moving vector of the block before the block is divided using the block division unit 140.

As described above, in the method according to the embodiments, since the moving vector estimated in the coupled block may be equally assigned to each block, a variance of the moving vector between the blocks may be reduced, whereby a deterioration in an image quality of an interpolated image may not be perceptible.

Also, when the blocks are overlapped in a boundary of an image, the method according to the embodiments may perform the motion estimation by re-coupling the blocks with respect to the divided blocks through operations S1020 and S1030 so as to reduce the motion estimation error.

Accordingly, the method according to the embodiments may hierarchically divide a size of a block and re-couple the divided block to estimate a motion of the block, thereby obtaining an accurate moving vector value in a boundary. As a result, the problem that the moving vector is assigned to a block including a boundary of an image in an identical direction may be solved, and thereby the boundary may be more accurately expressed in an interpolated image.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although a few embodiments have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus to estimate a motion, the apparatus comprising:
    an initial motion estimation unit to estimate a moving vector for a plurality of blocks of a current frame in an input image, wherein a motion estimation error corresponding to a motion predictive error value is determined for each of the plurality of blocks based on differences between the plurality of blocks from the current frame and respective matching blocks from another frame, wherein a current block among the plurality of blocks has a motion estimation error greater than a predetermined value;
    a block coupling unit to couple each block of the input image which neighbors the current block together with the current block if the respective block has a motion estimation error greater than the predetermined value; and
    a motion estimation unit to estimate the motion of the coupled blocks.

2. The apparatus of claim 1, wherein the motion estimation unit estimates the motion of the coupled blocks using a moving vector of neighbor blocks adjacent to the coupled blocks.

3. The apparatus of claim 1, wherein the block coupling unit determines whether a block having the motion estimation error greater than the predetermined value exists from among neighbor blocks with respect to blocks in which the motion estimation error is greater than the predetermined value, and couples the blocks in which the motion estimation error is greater than the predetermined value.

4. The apparatus of claim 3, wherein the motion estimation unit selects one of the neighbor blocks from among the neighbor blocks adjacent to the coupled blocks based on a compared result of the motion estimation error and the predetermined value, and estimates the motion of the coupled blocks using the selected neighbor block.

5. The apparatus of claim 4, wherein the motion estimation unit selects remaining neighbor blocks other than neighbor blocks in which the motion estimation error is greater than the predetermined value from among neighbor blocks adjacent to the coupled blocks, and estimates the motion of the coupled blocks using a moving vector of the selected neighbor block as a candidate vector.

6. The apparatus of claim 1, further comprising:
    a block division unit vertically and horizontally dividing a size of the block having the motion being estimated.

7. The apparatus of claim 6, wherein the block division unit assigns to the divided block a moving vector estimated with respect to the divided block before the block is divided.

8. A method of estimating a motion, the method comprising:
    estimating a moving vector for a plurality of blocks of a current frame in an input image;
    determining a motion estimation error corresponding to a motion predictive error value for each of the plurality of blocks based on differences between the plurality of blocks from the current frame and respective matching blocks from another frame, wherein a current block among the plurality of blocks has a motion estimation error greater than a predetermined value;
    coupling each block of the input image which neighbors the current block together with the current block if the respective block has a motion estimation error greater than the predetermined value; and
    estimating a motion of the coupled blocks at a motion estimation unit.

9. The method of claim 8, wherein the estimating estimates the motion of the coupled blocks using a moving vector of a neighbor block in which the motion estimation error is equal to or less than the predetermined value.

10. The method of claim 8, wherein the coupling determines whether a block having the motion estimation error greater than the predetermined value exists from among neighbor blocks with respect to blocks in which the motion estimation error is greater than the predetermined value, and couples the blocks in which the motion estimation error is greater than the predetermined value.

11. The method of claim 10, wherein the estimating selects one of the neighbor blocks from among the neighbor blocks adjacent to the coupled blocks based on a compared result of the motion estimation error and the predetermined value, and estimates the motion of the coupled blocks using the selected neighbor block.

12. The method of claim 11, wherein the estimating selects remaining neighbor blocks other than neighbor blocks in which the motion estimation error is greater than the predetermined value from among neighbor blocks adjacent to the coupled blocks, and estimates the motion of the coupled blocks using a moving vector of the selected neighbor block as a candidate vector.

13. The method of claim 8, further comprising:
    dividing, vertically and horizontally, a size of the block having the motion being estimated.

14. The method of claim 13, wherein the dividing assigns a moving vector to the divided block estimated with respect to the divided block before the block is divided.

15. A method to estimate motion, comprising:
- estimating a motion vector for a plurality of neighboring blocks of a current frame in an input image;
- calculating a motion estimation error corresponding to a motion predictive error value for each of the plurality of neighboring blocks based on differences between the plurality of neighboring blocks from the current frame and respective matching blocks from another frame;
- comparing each of the motion estimation errors of the plurality of neighboring blocks to a predetermined value;
- coupling blocks from among the neighboring blocks whose calculated motion estimation errors exceed the predetermined value; and
- calculating a motion vector of the coupled blocks.

16. The method of claim 15, wherein the calculating the motion vector of the coupled blocks comprises using a moving vector of neighbor blocks which are adjacent to the coupled blocks, other than a moving vector of neighbor blocks in which the motion estimation error is greater than the predetermined value.

17. The method of claim 16, further comprising:
- determining, after calculating the motion vector of the coupled blocks, whether any of the coupled blocks have motion estimation errors exceeding the predetermined value.

18. The method of claim 17, wherein if it is determined a first block from among the coupled blocks has a motion estimation error exceeding the predetermined value, the method further comprises coupling neighbor blocks of the first block whose motion estimation errors exceed the predetermined value, and calculating an updated motion vector of the coupled neighbor blocks of the first block.

* * * * *